United States Patent [19]

Kirchweger et al.

[11] 4,143,895
[45] Mar. 13, 1979

[54] INSTANT FASTENER FOR THE RELEASABLE FIXING OF A REMOVABLE HOUSING PART

[75] Inventors: Karl Kirchweger; Helmut Foidl, both of Graz, Austria; Hans List, 126, Heinrichstrasse, Graz, Austria; Josef Greier, Graz, Austria

[73] Assignee: Hans List, Graz, Austria

[21] Appl. No.: 825,779

[22] Filed: Aug. 18, 1977

[30] Foreign Application Priority Data

Aug. 27, 1976 [AT] Austria .................................. 6374/76

[51] Int. Cl.² .............................................. E05C 3/08
[52] U.S. Cl. ......................................... 292/223; 49/465
[58] Field of Search ....... 292/223, DIG. 71, DIG. 49, 292/113, 240, 48, 26, 302, 303, 304; 49/465, 472

[56] References Cited

U.S. PATENT DOCUMENTS

| 790,034 | 5/1905 | Davison | 49/465 |
|---|---|---|---|
| 1,784,551 | 12/1930 | Smith | 292/240 X |
| 1,789,359 | 1/1931 | Goodnow et al. | 49/472 |
| 2,210,495 | 8/1940 | North | 292/DIG. 71 |
| 2,237,060 | 4/1941 | Reynolds | 292/240 |
| 2,479,921 | 8/1949 | Gander | 292/DIG. 49 |
| 2,893,772 | 7/1959 | Edwards | 292/DIG. 71 |

*Primary Examiner*—Richard E. Moore
*Attorney, Agent, or Firm*—Watson, Cole, Grindle & Watson

[57] ABSTRACT

A quick release fastener for the releasable fixing of a removable housing part, in particular a maintenance cover of an internal combustion engine with a sound-reducing enclosure, being fixed to a stationary housing part, the housing part comprising holders for opposing outer rims of the removable housing part.

7 Claims, 3 Drawing Figures

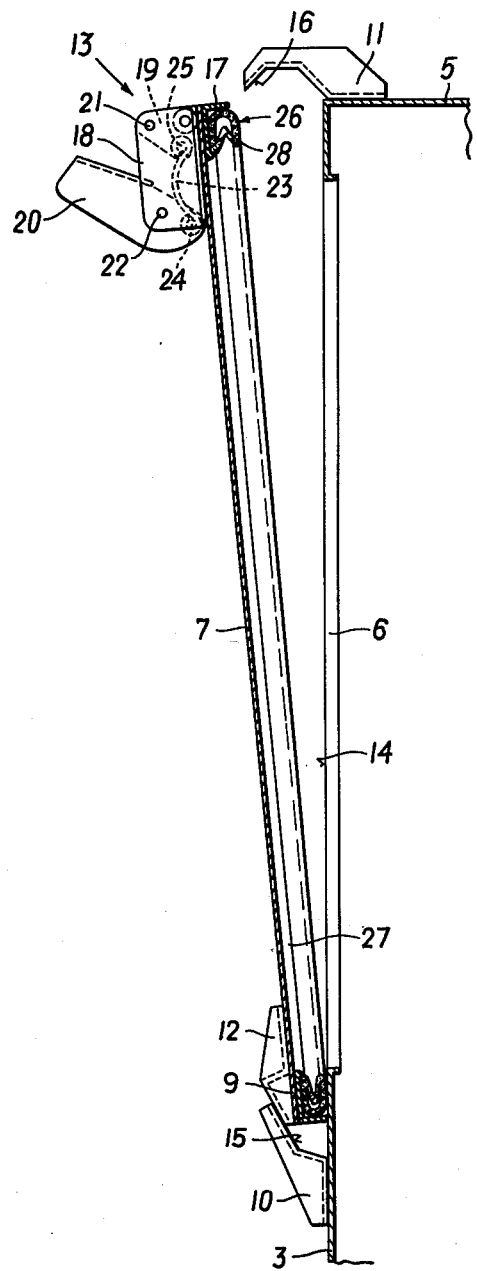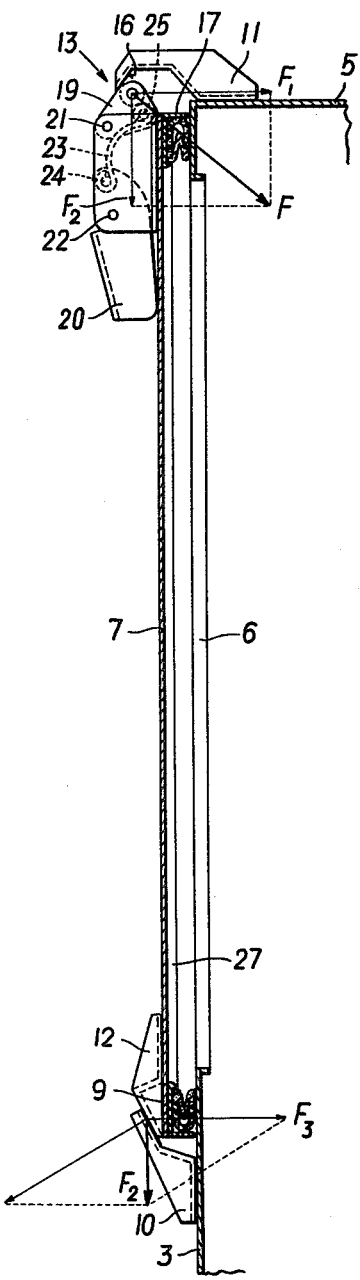

INSTANT FASTENER FOR THE RELEASABLE FIXING OF A REMOVABLE HOUSING PART

BACKGROUND OF THE INVENTION

1. Field of the Invention

This invention relates to an instant fastener for releasably fixing a removable housing part to a fixed housing part, and in particular to a quick release fastener for a removable maintenance cover for an internal combustion engine fitted with a noise - reducing enclosure.

2. Description of the Prior Art

A fastener of the present type is shown in DT-OS 2,534,612. In this prior fastener, the holders are in the form of retaining clips projecting from the fixed housing part. Gripping levers are swivel pivoted to the rim of the removable housing part, each carrying hinged thereto a fishplate to the other end of which an angular double arm cantilever spring is swivel connected. The angular arm of the cantilever spring hangs in its respective retaining clip and, when the gripping lever is in the clamping position, the free end of the arm lies with resilient force against the rim of the movable housing part, so that this latter is pressed against the fixed housing part. The covered housing aperture is sealed outwards by a gasket disposed on the inside of the removable housing part.

The use of these simple and easily operated fasteners requires that they be accessible without difficulty when the housing concerned has been mounted in position. In the case of noise-reducing casings for internal combustion engines, however and in particular those for assembly in trucks, these requirements are often unsatisfied as a large part of the removable housing part, e.g. the maintenance cover, is covered by the vehicle chassis after the engine has been installed. In particular, the lower edges of lateral maintenance covers on truck engines with noise-reducing enclosures are either inaccessible or accessible only with great difficulty, so that neither fasteners nor bolts can be fitted in these positions for releasably fixing this cover.

The object of the present invention is to provide an quick release (instant) fastener of the aforesaid type which is easily operable without the aid of a tool, and for which any manipulation at difficulty accessible positions on the housing concerned is unnecessary.

SUMMARY OF THE INVENTION

The foregoing object is attained according to the invention because each holder comprises a support surface facing the contact surface of the fixed housing part, and these support surfaces form acute angles with the contact surface, the openings of these angles lying opposite each other, one outer rim of the removable housing part being insertable between the support surfaces of the relative holders and the contact surface of the fixed housing part, each holder at the opposing outer rim carrying a movable fastening element which when in its closed position grips back on the relative holder and lies against its support face with resilient force.

As the dismantling and further assembly of the removable housing part requires that only the movable fastening elements or their operating members be accessible, these being provided only on one of the outer rims of the removable housing part, comfortable assembly and dismantling of the removable housing part is ensured, even if the end distant from the fasteners is inaccessible or accessible only with great difficulty. Thus, for example, it is possible in the case of engines with noise-reducing enclosures mounted in trucks to fit the movable fastening elements to the upper rim of the upright lateral maintenance covers of the engine, and to remove the maintenance covers in an upward direction after releasing the fasteners, even though the lower edges of the maintenance covers in the majority of cases are covered by parts of the vehicle chassis. On re-assembling the maintenance cover care need only be taken that its lower outer rim engages in the appropriate holder.

By making all holders with inclined support surfaces facing the contact surface of the fixed housing part, it is ensured that the removable housing part lies against the fixed housing part with uniform force when in the assembled condition. When the fastening element is in the closed position, a closing force acts perpendicular to the support surface of the relative holder, this force possessing a component perpendicular to the contact surface and a component parallel to the contact surface. The latter force component acts on the outer rim of the removable housing part opposite the fasteners, with the inclination of the support surfaces of the relative holders again providing a force component perpendicular to the contact surface of the fixed housing part. Because of the uniform pressing force, a satisfactory oiltight connection between the removable housing part and fixed housing is obtained if corresponding gaskets are present.

According to a preferred embodiment of the invention, the fastening element is in the form of a pawl and is swivel pivoted to a support fixed to the removable housing part and preferably in the form of a channel section with the section flanges pointing outwards, a gripping lever being rotatably supported on the support about an axis parallel to the swivel axis of the fastening element, and the fastening element and gripping lever being connected together by a fishplate, e.g. in the form of a flat spring, hinged to the fastening element and gripping lever, so that automatic locking occurs when the fastener is in the closed position. This embodiment of the fastener is distinguished by its constructional simplicity and operational reliability. As the dead-centre position of the movable parts of the fastener is exceeded when in the closed position, any possible loosening or release of the fasteners by vibration deriving from the engine or the roadway is reliably prevented.

In all cases where an oil-tight connection between the removable and fixed housing parts is necessary, e.g. in the case of engines with a noise-reducing enclosure which comprise only a support carrying the crankshaft bearing instead of a closed crankcase and in which the noise-reducing enclosure therefore forms the oil-bearing outer wall of the engine, it is of particular advantage according to a further embodiment of the invention if the removable housing part carries an endless sealing strip in known manner extending along the inside of its outer rim, and if the sealing strip is in the form of a hollow section open towards the middle of the removable housing part, and clamped between the inwardly pointing circumferential rim of the removable housing part and a strip, parallel thereto, projecting from the inside of the removable housing part. By forming the sealing strip as an open hollow section, sufficient gasket resilience is obtained so that the forces which have to be applied by the fasteners for obtaining sufficient pressure on the gasket may be kept to within acceptable limits.

The recessing of the sealing strip means that its deformation is always in the same correct direction. The tongue-like part of the sealing strip which cooperates with the fixed housing part possesses sufficient resilience and elastic deformability to compensate for any unevenness and deformation both of the removable and of the fixed housing part. Thus, even in the case of larger maintenance covers, it is possible to keep the number of fasteners and holders relatively small.

DESCRIPTION OF THE DRAWINGS

The present invention will now be described in greater detail hereinafter with reference to a preferred embodiment illustrated in the drawings.

In the drawings,

FIGS. 2 and 3 show a detail of an instant fastener to an enlarged scale, in the open and closed position respectively.

DESCRIPTION OF THE PREFERRED EMBODIMENT

Figure 1:
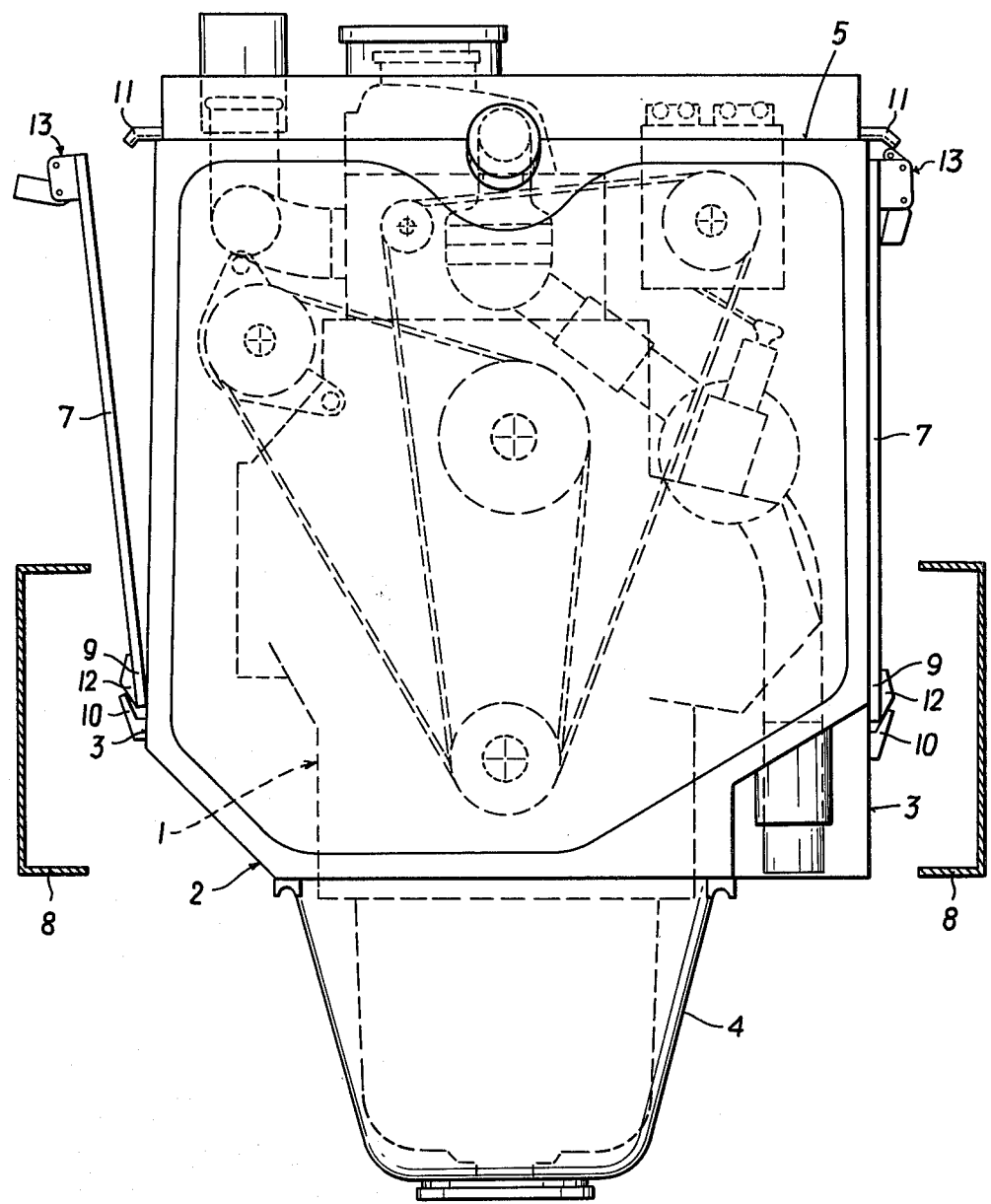
FIG. 1 shows a front elevation of an assembled vehicle engine with a noise-reducing enclosure, the noise-reducing enclosure being fitted with fasteners according to the invention.

The internal combustion engine 1 shown in FIG. 1 with dashed lines comprises a multi-part noise-reducing casing 2 connected to the engine in a known manner by support elements, not shown, which insulate against sound conduction. The casing 2 comprises upright side walls 3, a trough-shaped lower part 4, an upper cover wall 5 and front and back end walls (not shown on the drawing).

Each side wall 3 includes a large-area cutout 6 (see FIG. 2 and 3) which is closable by a removable maintenance cover 7. In the left half of FIG. 1 and in FIG. 2, the maintenance cover 7 is in the open position, while in the right half of FIG. 1 and in FIG. 3 it is in the closed position. FIG. 1 shows the assembly position of the enclosed internal combustion engine 1 between the two main longitudinal girders 8 of a truck chassis, not shown. As can be seen, the lower outer rim 9 of each maintenance cover 7 is covered by one of the main longitudinal girders 8, and is thus practically inaccessible without taking out the engine. In order to obtain simple and rapid removal of the maintenance cover 7 and its replacement after carrying out the required maintenance work on the internal combustion engine, according to the invention special holders 10, 11 are provided on the casing, and guides 12 and instant fasteners 13 cooperating with these holders are provided on the maintenance covers 7. The holders 10 are fixed, e.g. by welding, to the sider wall 3 below the cutout 6 and the holders 11 are likewise fixed to the upper cover wall 5 of the casing 2. Each holder 10 comprises a support surface 15 facing the contact surface 14 of the side wall 3. The support surface 15 forms an acute angle with the contact surface 14, and cooperates with a counter-surface on the guide 12 of the maintenance cover 7. A like support surface 16 is provided on each of the upper holders 11. The acute angles formed between the support surfaces 15, 16 and the contact surface 4 lie with their openings opposing each other.

The instant fasteners 13 are fixed to the outside of the maintenance cover 7 spaced-apart from each other in the region of the upper outer rim 17. They each consist of a channel section support 18 with the section flanges pointing outwards, and on which a fastening element 19 in the form of a pawl and a gripping lever 20 are pivoted to swivel about mutually parallel axes 21 and 22. The fastening element 19 and gripping lever 20 are operationally connected by a fishplate 23 in the form for example of a flat spring, one end of which is hinged to a pivot 24 on the gripping lever 20 and its other end is hinged to a pivot 25 on the fastening element 19.

In the open position of the instant fastener 13, shown in FIG. 2, the fastening element 19 has been swung inwards between the flanges of the channel section support 18, so that the maintenance cover 7 can be swung outwards into the illustrated position and then removed by lifting out of its lower holders 10.

In the closed position shown in FIG. 3, in which the gripping lever 20 points downwards, the fastening element 19 is held by the fishplate 23 in the outward swung position, in which the fastening element 19 grips backwards agaínt the holders 11 and pushes with resilient force against the support surface 16 of the holder 11. Thus a force F acts perpendicular to the support surface 16 and possesses a component $F_1$ perpendicular to the contact surface 14 and a component $F_2$ parallel to the contact surface 14. While the component $F_1$ provides the maintenance cover 7 with its required contact pressure against the side wall 3, the component $F_2$ acts against the support surface 15 of the lower holders 11. Thus a force component $F_3$ arises normal to the contact surface 14 in the region of the lower outer rim 9, and this provides the lower part of the maintenance cover 7 with its required pressure against the side wall 3.

In order to ensure a reliable seal for the casing 2 in the region of the cutout 6 when the maintenance cover 7 is closed, this letter comprises on its inside an endless sealing strip 26 extending along its outer rim. The sealing strip 26 is clamped between the inwardly pointing outer rim of the maintenance cover 7 and a strip 27 projecting from the inside of the maintenance cover 7 parallel to the circumferential rim. The sealing strip 26 has a hollow section open towards the middle of the maintenance cover 7, and its inner flange 28 is in the form of a flexible tongue which fits tightly against the contact surface 14 of the side wall 3 when the maintenance cover 7 is closed. This shaping gives appropriate resilience and elastic deformability to the sealing strip 26, so that any manufacturing inaccuracies or unevenness of either the maintenance cover 7 or contact surface 14 may be compensated, and the fastening force necessary for reliable sealing may be kept relatively small.

We claim:

1. An enclosure for an internal combustion engine which has a removable maintenance cover, said enclosure including a side having an opening allowing access to said enclosed engine, a removable maintenance cover capable of covering said opening, first and second support means mounted on said enclosure adjacent opposed sides of said opening for fastening said maintenance cover thereto to cover said opening, and first and second holder means on opposite sides of said maintenance cover which respectively cooperate with said first and second support means on said enclosure to fasten said maintenance cover to cover said opening; each said first and second support means mounted on said enclosure comprising a base portion and an extension portion which extends away from said base portion in a direction towards the other of said opposed supports, each said extension portion having a supporting surface facing the side of said enclosure having said opening; said first holder means mounted on said maintenance cover comprising a guide means capable of snugly fitting within the area formed between the supporting surface of the exterior portion of said first support means mounted on said enclosure and the side of said enclosure having said opening; said second holder means mounted on said maintenance cover comprising a movable fastening element capable of fitting within the area formed between the supporting surface of the extension portion of said second support means mounted on said enclosure and the side of said enclosure having said opening.

2. The enclosure of claim 1 wherein said second holder means mounted on said maintenance cover includes a flange means attached to said maintenance cover, said flange means comprising section flanges extending away from said maintenance cover so as to form a channel section, a fastening element pivotally connected between said section flanges, a gripping lever pivotally connected between said section flanges, and a fishplate positioned between said section flanges and connecting said fastening element and said gripping lever; and operable such that when said gripping lever is rotated to contact said side of said enclosure having the opening, said fastening element will rotate such that a portion thereof will press against the supporting surface of the extension portion of said second support means.

3. The enclosure of claim 2 wherein said fishplate is in the form of a flat spring pivotally connected at one end to said gripping lever and at its opposite end to said fastening element.

4. The enclosure of claim 1 wherein said maintenance cover includes an endless sealing strip extending along the periphery of said maintenance cover on one side thereof, said sealing strip being in the form of a hollow section open towards the center portion of said maintenance cover, wherein said first and second holder means mounted on said maintenance cover are mounted on the second side thereof and wherein said sealing strip becomes clamped between said maintenance cover and the periphery of said side of said enclosure forming said opening when said maintenance cover is fastened against said side of said enclosure to cover said opening.

5. The enclosure of claim 1 wherein said enclosure comprises a sound-reducing enclosure having four side walls, an upper cover wall and a trough-shaped lower part, said side of said enclosure having said opening comprising one of said four side walls.

6. The enclosure of claim 5 wherein at least two of said side walls having openings therein and corresponding said maintenance covers for covering thereover.

7. The enclosure of claim 1 wherein said guide means has a generally triangularly-shaped configuration.

* * * * *